Nov. 9, 1937.  R. THOMAS  2,098,767
DOUBLE SIMULTANEOUS MOTION PICTURE APPARATUS
Filed March 18, 1935
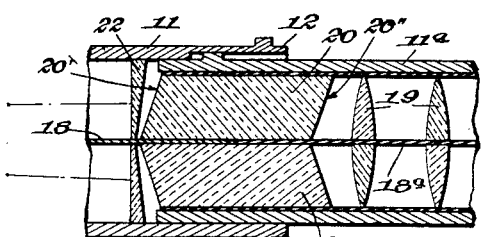
Fig. 3.
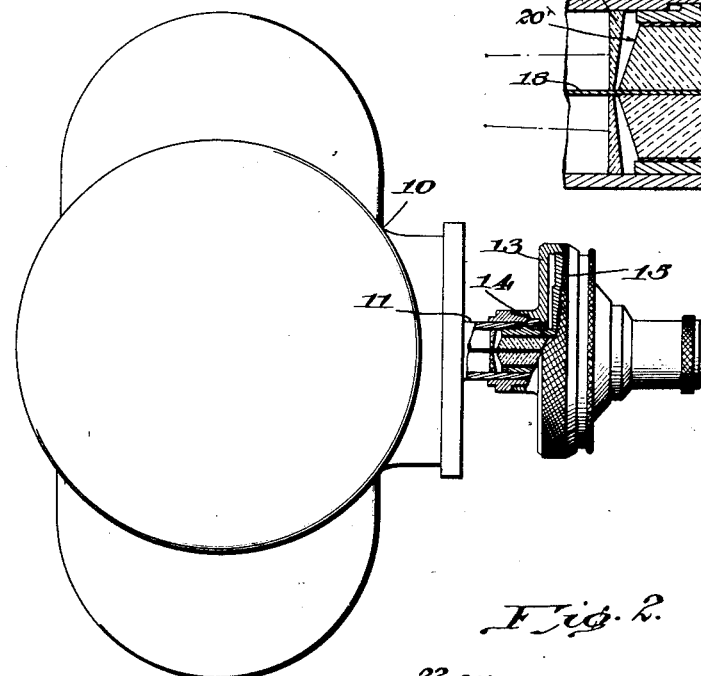
Fig. 1.
Fig. 2.
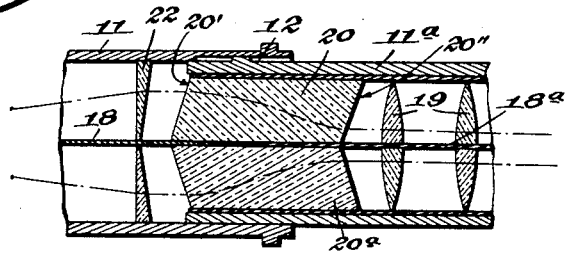
Fig. 4.
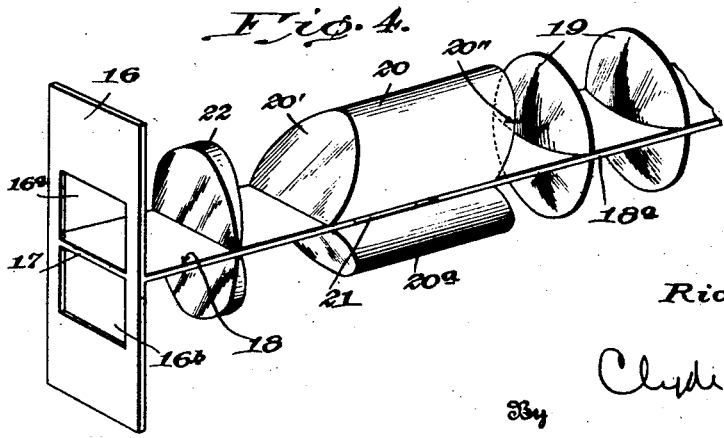
Inventor,
Richard Thomas.
By Clyde L. Rogers
his Attorney Patented Nov. 9, 1937

2,098,767

UNITED STATES PATENT OFFICE 2,098,767

DOUBLE SIMULTANEOUS MOTION PICTURE APPARATUS

Richard Thomas, Los Angeles, Calif., assignor of one-half to William Jennings Bryan, Jr., Los Angeles, Calif.

Application March 18, 1935, Serial No. 11,701

5 Claims. (Cl. 88—16.6)

This invention relates to double simultaneous motion picture apparatus wherein two picture images of each exposure, with differing color values are impressed upon a film by a specially constructed camera and adapted to be projected in superimposed relation upon a screen to produce a motion picture with natural color effects. The invention has to do more particularly with a camera adapted for taking such pictures wherein provision is made for eliminating visible parallax. A camera of this type having lens systems adapted for this purpose is shown in my prior Patent No. 1,949,339 patented February 27, 1934 and the present invention is in the nature of an improvement and further development of the lens systems shown in said patent. In motion picture apparatus of the character here under consideration, chordally cut lenses are employed, the optical axes of these lenses being close together for the purpose of eliminating visible parallax. In order to produce two separated images of a desired size (particularly when the optical axes are closer together than the geometric centers of the image areas), means are required for the purpose of separating beams of light passing through the chordally cut lenses. The present invention has for its principal object the provision of improved means whereby the beams of light are regulatably spread apart and two substantially identical separated images obtained.

The foregoing and other objects and advantages of the invention will be better understood from the following detailed description taken in connection with the accompanying drawing, and the distinctive features of novelty will be thereafter pointed out in the appended claims.

Referring to the drawing:

Figure 1 is an elevation of a motion picture camera embodying the invention, a portion thereof being broken away in section to better illustrate the invention, Figure 2 is a partial central longitudinal section on a relatively larger scale showing the lens systems of the camera, Figure 3 is a sectional view similar to Figure 2, but showing the lens systems in a different position of adjustment, and Figure 4 is a perspective view of such lens systems and the aperture plate.

10 indicates the body or housing of the camera having projecting at the front thereof a lens barrel 11. A second lens barrel member 11a is slidably fitted in the end of the barrel 11 being held from turning with respect thereto by a stud and slot interengagement 12. Means is provided for adjusting the barrel member 11a endwise with respect to the barrel 11 for focusing purposes, such means being shown as a flange disk 13 secured to the barrel 11 as seen at 14 and having its internally threaded flanged periphery engaged with a threaded disk 15 fixed to the barrel member 11a. 16 denotes the aperture plate of the camera having double apertures 16a, 16b and from the dividing web 17 between such apertures extends a septum member 18. This septum member extends forward between the lens systems and in cooperation with a second septum member 18a completely separates the two lens systems of the camera. 19 denotes the front focusing lenses of the camera secured in the barrel member 11a and having the septum member 18a extending therebetween. These lenses as described in my said prior patent are ground away at their adjacent sides so as to locate the optical axes thereof relatively close together, i. e. not more than 0.300" which has the effect of eliminating the visible parallax. 20, 20a designate a pair of members which I term refracting members, each of these members comprising a block or mass of glass relatively extended lengthwise of the lens systems and having its ends 20', 20" in parallelism and sloping with respect to the intermediate septum at a small angle preferably about 15°, the longer the extent of these members lengthwise of the axes, the smaller the required angle of the ends. It will be understood that for a glass of a given index refraction, the longer the refracting members (in the direction of the optical axes) the greater will be the spreading of the rays. The planes comprising the ends of the refracting members are inclined toward the lenses 19 and away from the septum 18a and outwardly away from the aperture plate at the other end thereof. The refracting members 20, 20a are fixed in the barrel 11a and with respect to the septum member 18a, while the septum member 18 has sliding adjustment in a slot 21 between such members at the other end portion thereof. The refracting members 20, 20a are made of glass with a relatively high index of refraction, preferably of flint glass, and their function is to bend outward the beams of light passing through the respective systems so that the optical axes thereof are separated approximately the required distance. 22 denotes a prism unit, the elements whereof have their apices toward each other, i. e. abutting the septum 18. The prism unit is fixed in the barrel 11 and hence the outer portions of the lens systems including the refracting members 20, 20a are adjustable toward and from the prism unit as the barrel member 11a is adjusted endwise with respect to the barrel 11. The function of this prism 22 is to serve as a compensating or separation corrective element in cooperation with the refracting members 20, 20a whereby exact separation of the deflected rays transmitted through the refracting members is maintained throughout the range of focus of the camera. Thus the refracting members 20, 20a will in practice be adjusted farther away from the corrective prisms 22 for close-up focusing as seen at Figure 2, while they will be adjusted relatively close to the prisms for the focusing of more distant objects as seen at Figure 3. The prisms 22 are illustrative of the corrective elements which cooperate with the refracting members. During focusing, the objective lens elements 19 and the refracting members 20 move together away from and toward the prism members 22. The angularity of the prisms is such that the resulting images are maintained in proper spaced relation throughout the focusing range so that the pair of images formed on the film may be superimposed in complete registration. I have found the described elements which I term refracting members to be particularly effective for the described separation of the images and for cooperation in focusing, and by the term refracting members as used herein I mean a pair of elements relatively extended lengthwise of the lens systems and with their light impinging surfaces converging outward toward the object field, and with their inner surfaces converging inward toward the film or image field, such surfaces at the two ends of each refracting member being in substantial parallelism and at a relatively small angle to a plane perpendicular to the septum. One of the advantages of using refracting members in the form of plates for displacing the rays as described hereinabove lies in the fact that the emerging ray is always substantially parallel to the entering ray and therefore requires less corrective treatment than is the case with some of the prismatic means disclosed in my prior patent. Moreover, in case very large lenses are used, the refracting members of this invention minimize the possibility of prismatic distortion.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having now described my invention, what I claim as new and desire to secure by Letters Patent is:

1. In a motion picture camera, the combination with separation corrective means, of a unit equipped with means for bodily axial adjustment with respect to said means embodying a pair of chordally cut objective lenses with their optical axes close together, a septum between said lenses to maintain the light passing through one of said lenses separate from that passing through the other, and plano-parallel refractors mounted with their plane surfaces at an acute angle to the optical axes of the lens segments, said refractors positioned in the line of light passing through each of said lenses and adapted to deflect the light passing through each lens from that passing through the other.

2. In a motion picture camera, an assembled optical unit having means for bodily axial adjustment with respect to a separation corrective means, said unit embodying a pair of chordally cut objective lenses with their optical axes close together, a septum between said lenses adapted to maintain light passing through one of said lenses separate from that passing through the other, and plano-parallel refractors mounted with their plane surfaces at an acute angle to the optical axes of the lens segments, said refractors positioned in the line of light passing through each of said lenses and adapted to deflect light passing through each of said lenses from the light passing through the other.

3. An assembled optical unit as set forth in claim 2, wherein the plano-parallel refractors are of segmental cylindrical form in cross section and are relatively elongated in the direction of the light rays therethrough and between the plane surfaces thereof.

4. A pair of segmental, plano-parallel refractors for use in an optical unit as set forth, having plane sides parallel to their axes, means to mount said refractors with their plane sides parallel and spaced to provide a slot therebetween, said refractors having the plane surfaces at the ends thereof at an acute angle to the longitudinal axis thereof, the distance between said end plane surfaces being relatively great as compared with the transverse dimension thereof, and a sliding septum in said slot.

5. In a motion picture camera, the combination of a pair of chordally cut objective lenses with their optical axes close together, a septum between said lenses adapted to maintain light passing through each of said lenses separate from that passing through the other, plano-parallel refractors having plane sides parallel to their axes, mounted with the end plane surfaces thereof at an acute angle to the optical axes of the lens segments, and with their longitudinal plane surfaces juxtaposed and spaced apart to form a slot, said refractors positioned in the line of light passing through each of said lenses, said refractors adapted to deflect the light passing through each of said lenses from the light passing through the other, and a prism positioned in the path of light passing through each of said lenses and refractors, said prisms being adapted to direct the deflected light upon spaced image areas of film to be exposed, said septum extending into the slot between the refractors.

RICHARD THOMAS.